United States Patent [19]
Ono

[11] Patent Number: 5,870,948
[45] Date of Patent: Feb. 16, 1999

[54] APPARATUS FOR MAKING SEAWEED ROLL

[75] Inventor: Hiroshi Ono, Hachioji, Japan

[73] Assignee: Chiba and Associates, Tokyo, Japan

[21] Appl. No.: 6,660

[22] Filed: Jan. 13, 1998

[51] Int. Cl.[6] ............................. A21C 9/00; A21C 11/00; A23P 1/00; B29C 69/00
[52] U.S. Cl. ...................... 99/450.6; 99/450.2; 99/450.7; 425/112; 425/383
[58] Field of Search .................... 99/352, 353, 450.1, 99/450.2, 450.6, 450.7, 494; 426/502, 501, 297, 512; 425/110, 112, 319, 383, 436 R, 308, 328, 298, 343, 204; 53/215, 216, 390, 516

[56] References Cited

U.S. PATENT DOCUMENTS

| | | | |
|---|---|---|---|
| 1,873,920 | 8/1932 | Bemis | 99/450.7 |
| 3,930,440 | 1/1976 | Ohkawa | 99/450.6 |
| 4,047,478 | 9/1977 | Trostmann et al. | 426/502 |
| 4,334,464 | 6/1982 | Shinriki | 99/450.6 |
| 4,439,124 | 3/1984 | Watanabe | 425/112 |
| 4,457,225 | 7/1984 | Bakker | 99/450.6 |
| 4,516,487 | 5/1985 | Madison et al. | 99/450.2 X |
| 4,637,304 | 1/1987 | Suzuki | 99/450.2 |
| 4,674,967 | 6/1987 | Oseka | 425/383 X |
| 4,687,670 | 8/1987 | Rodriguez | 426/297 |
| 4,953,455 | 9/1990 | Figueras et al. | 53/215 X |
| 5,381,728 | 1/1995 | Tateno | 99/450.1 |
| 5,387,149 | 2/1995 | Caveza | 99/450.6 X |

*Primary Examiner*—Timothy F. Simone
*Attorney, Agent, or Firm*—Paul A. Guss

[57] ABSTRACT

A seaweed roll making apparatus (10) has a base plate (16) fixedly mounted on a base (12), a pair of first and second shafts (18, 20) disposed adjacent to opposite sides of the base plate (16), first and second gears (26a, 26b) fixed to respective ends of the first shaft (18), third and fourth gears (28a, 28b) fixed to respective ends of the second shaft (20), the first and third years (26a, 28a) meshing with each other and the second and fourth gears (26b, 28b) meshing with each other, a pair of first and second turn plates (22, 24) fixed respectively to the first and second shafts (18, 20), a third turn plate (34) angularly movably mounted on the second turn plate (24) and having cam members (38a, 38b) fixed thereto, and a frame (54) for shaping a bed (B) of rice to a predetermined thickness in a predetermined spatial range. The seaweed roll making apparatus does not require a high level of skill and experience on the part of the operator, can produce seaweed rolls of a constant quality which does not vary from operator to operator, needs no large installation space, requires a relatively easy maintenance service, and is inexpensive to manufacture.

11 Claims, 18 Drawing Sheets

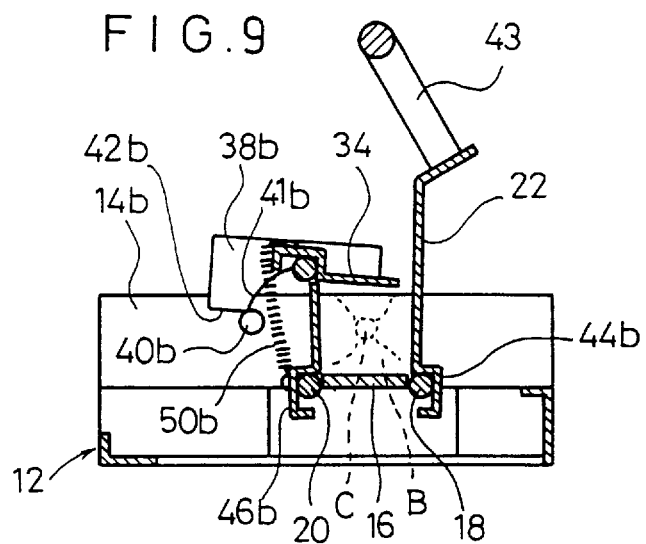
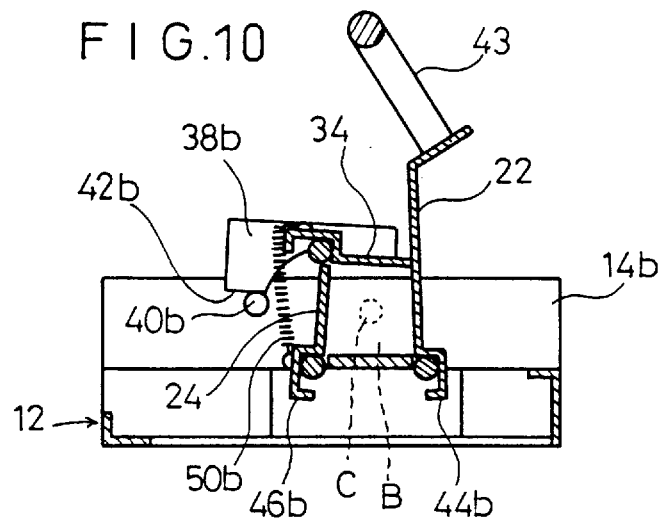

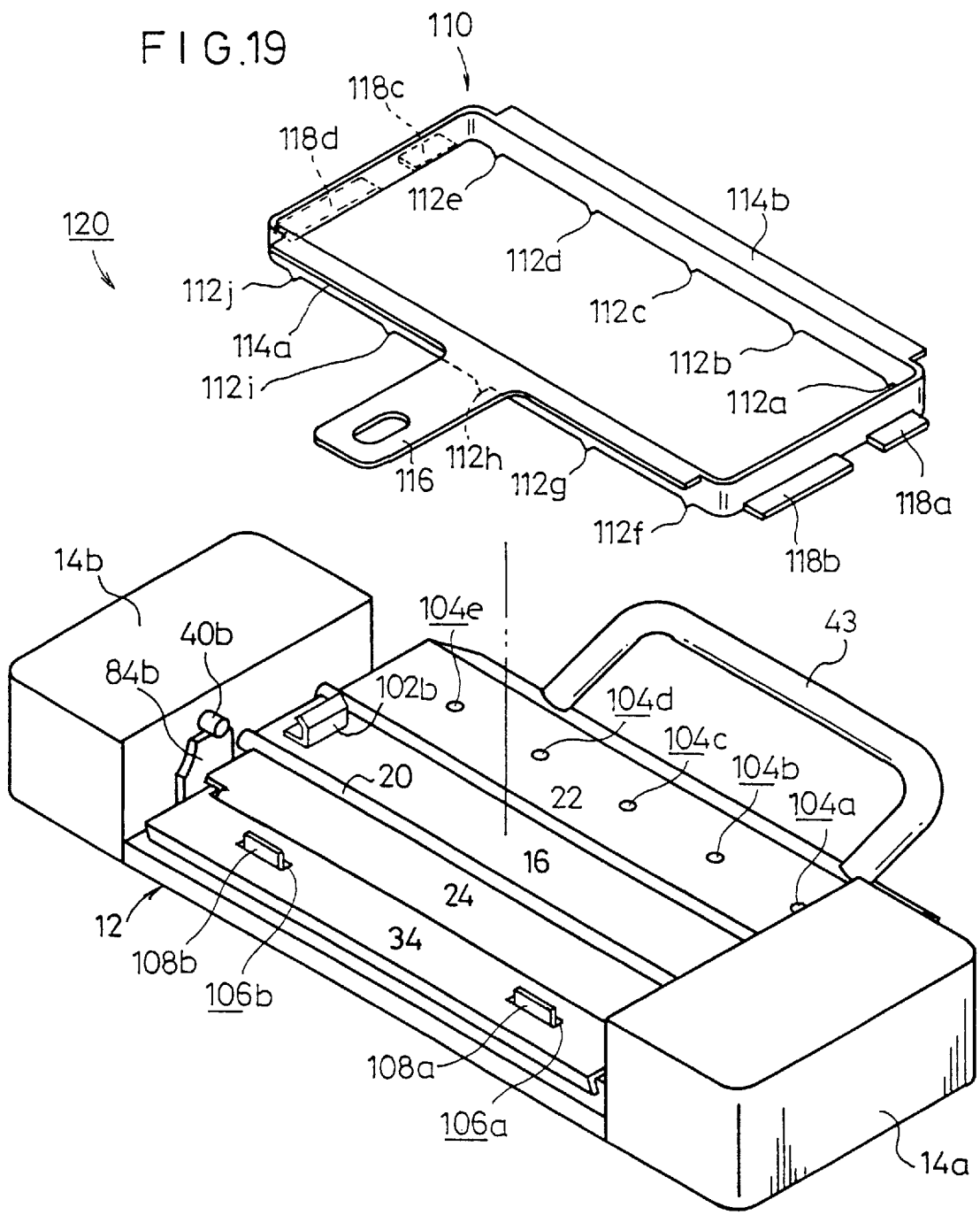

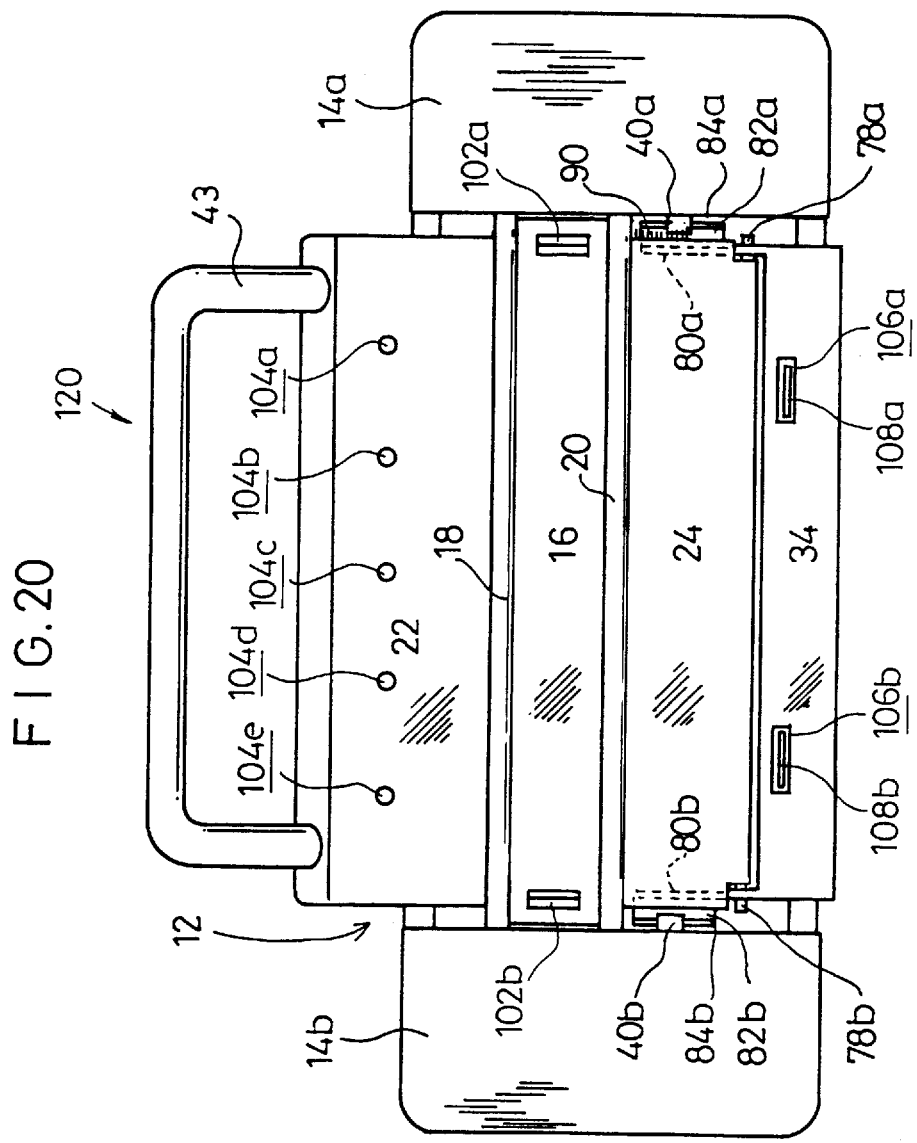

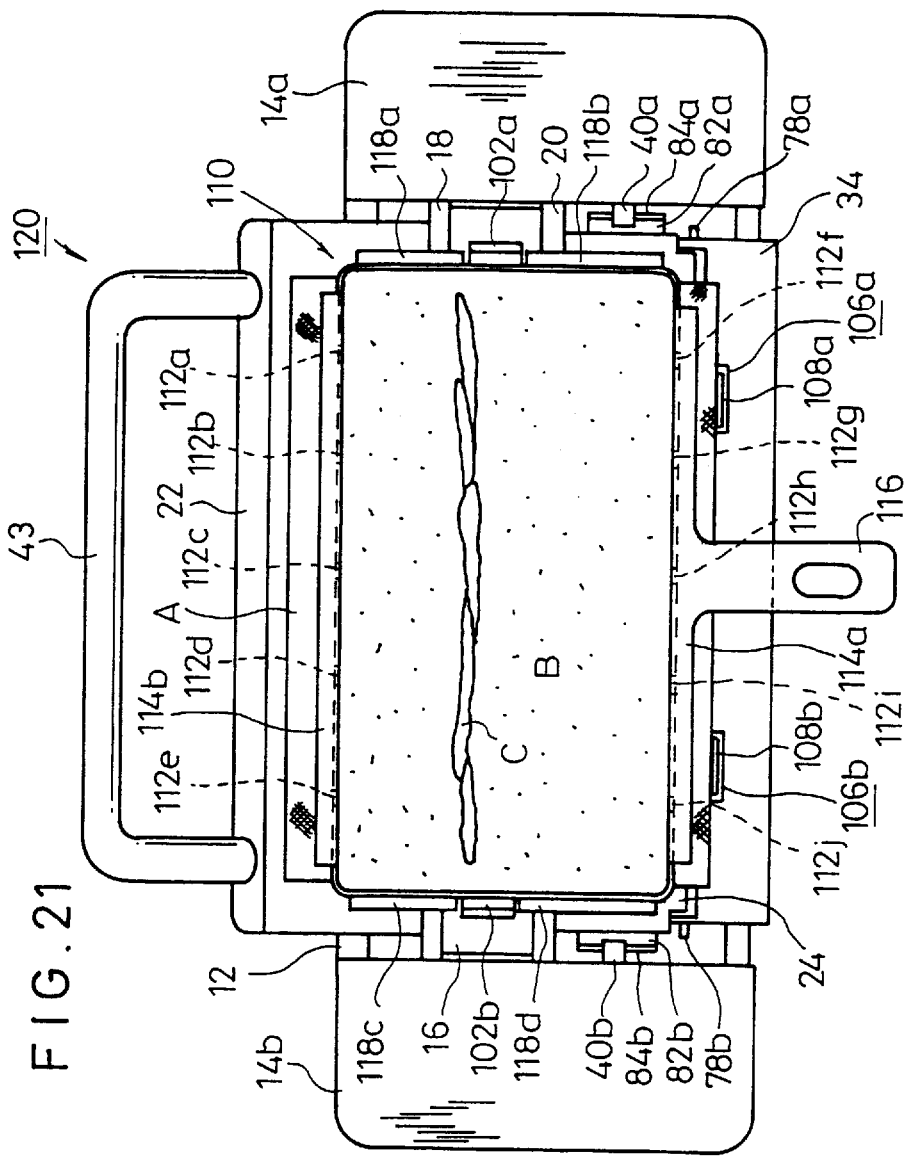

APPARATUS FOR MAKING SEAWEED ROLL

BACKGROUND OF THE INVENTION

1. Field of the Invention

The present invention relates to an apparatus for making a seaweed roll, known as "norimaki" which is one of the sushi varieties in Japan, by placing a seaweed sheet, a bed of rice, and a core material on a base plate and first through third turn plates and angularly moving the turn plates.

2. Description of the Related Art

In has been the customary practice to make a seaweed roll by successively placing a seaweed sheet, a bed of rice, and a core material, in the order named, on a bamboo rolling mat, and manually rolling them up. It requires a high level of skill and experience to make a desired seaweed roll of good appearance with the core material positioned in its center. The quality of seaweed rolls varies from person to person, and the efficiency of a process of manually making seaweed rolls is generally low.

Some professional sushi bars and sushi takeout shops have automatic seaweed roll making apparatus for mass-producing seaweed rolls. However, such automatic seaweed roll making apparatus take up a large installation space, require a complex maintenance service, are highly expensive, and fail to make seaweed rolls as efficiently as expected.

SUMMARY OF THE INVENTION

It is a general object of the present invention to provide a seaweed roll making apparatus which is relatively small in size, can be handled with ease, and can make seaweed rolls efficiently.

Another object of the present invention is to provide a seaweed roll making apparatus which requires a relatively easy maintenance service and is inexpensive to manufacture.

Still another object of the present invention is to provide a seaweed roll making apparatus which does not require a high level of skill and experience on the part of the operator, can produce seaweed rolls of a constant quality which does not vary from operator to operator, and needs no large installation space.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 9 is a cross-sectional view taken along line VI—VI of FIG. 2, showing pins engaging straight surfaces;

FIG. 10 is a cross-sectional view taken along line VI—VI of FIG. 2, showing a completed seaweed roll;

FIG. 19 is an exploded perspective view of a seaweed roll making apparatus according to a fourth embodiment of the present invention;

FIG. 20 is a plan view of the seaweed roll making apparatus shown in FIG. 19; and FIG. 21 is a plan view showing the manner in which of the seaweed roll making apparatus shown in FIG. 19 is used.

DETAILED DESCRIPTION OF THE PREFERRED EMBODIMENTS

Figure 1:
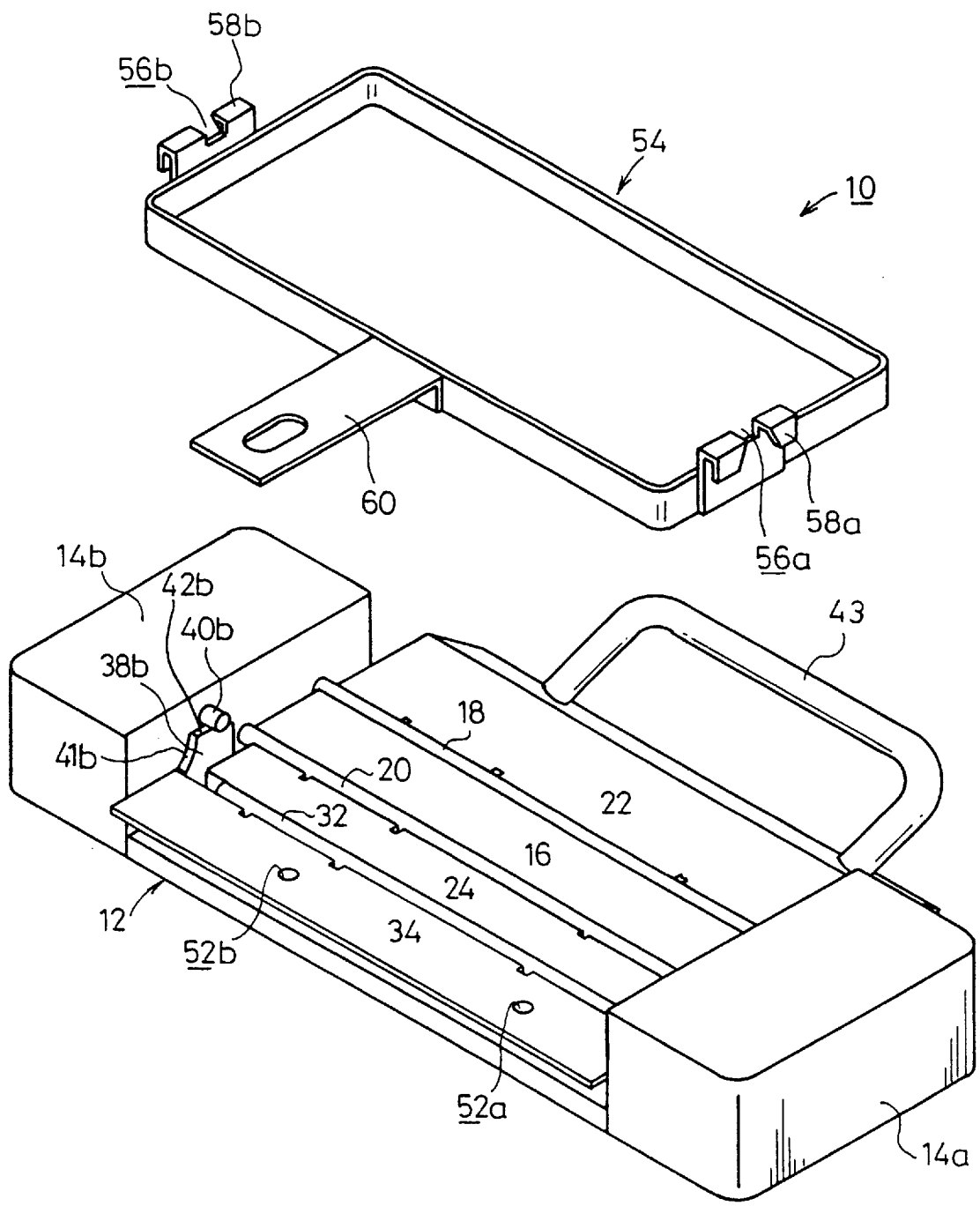
FIG. 1 is an exploded perspective view of a seaweed roll making apparatus according to a first embodiment of the present invention.
Figure 2:
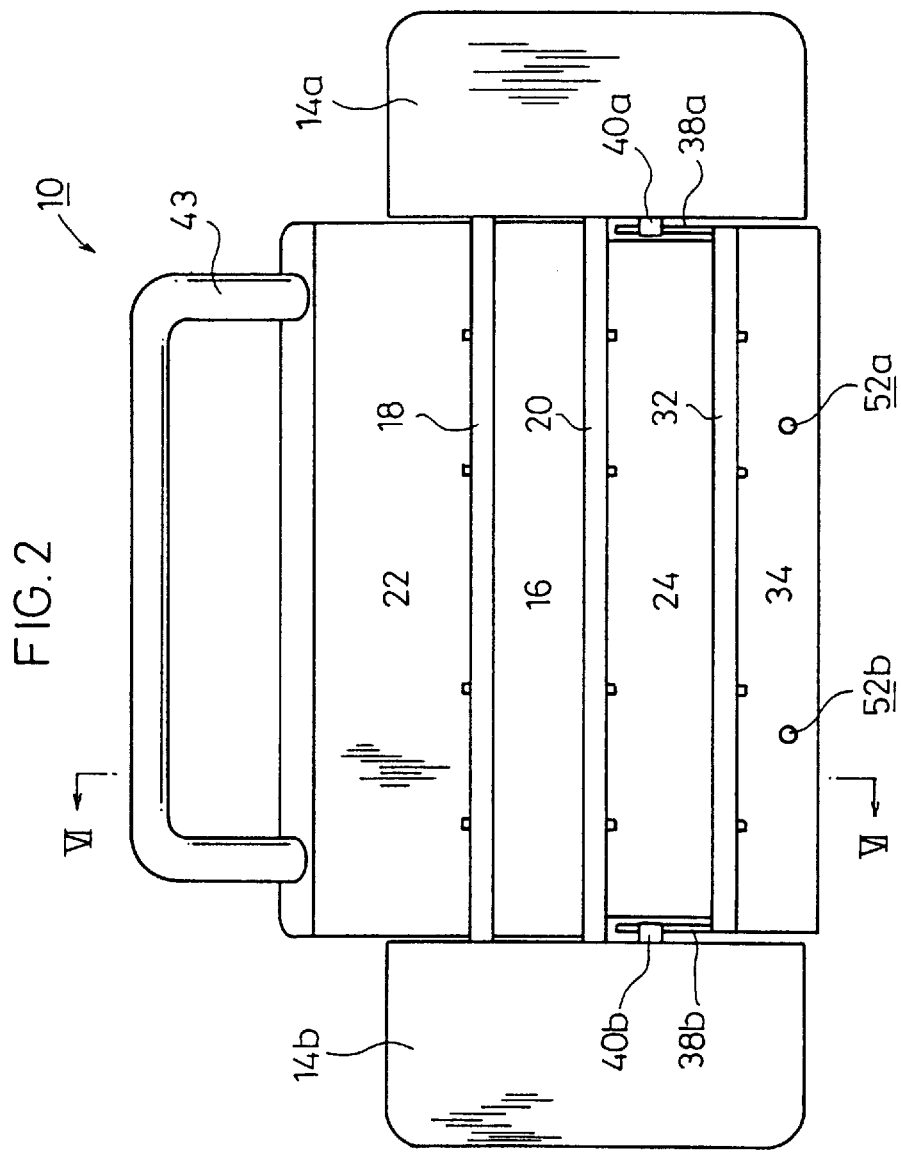
FIG. 2 is a plan view of the seaweed roll making apparatus shown in FIG. 1.

As shown in FIGS. 1 and 2, a seaweed roll making apparatus 10 according to a first embodiment of the present invention has a base 12 including a pair of substantially rectangular casings 14a, 14b disposed on respective longitudinal opposite ends thereof. An elongate rectangular base plate 16 is fixedly mounted on the base 12 and extends longitudinally between the casings 14a, 14b. First and second shafts 18, 20 extend between the casings 14a, 14b longitudinally along respective opposite longitudinal sides of the base plate 16. The first and second shafts 18, 20 have opposite ends extending into the casings 14a, 14b. A first turn plate 22 is secured to the first shaft 18, and a second turn plate 24 is secured to the second shaft 20.

Figure 3:
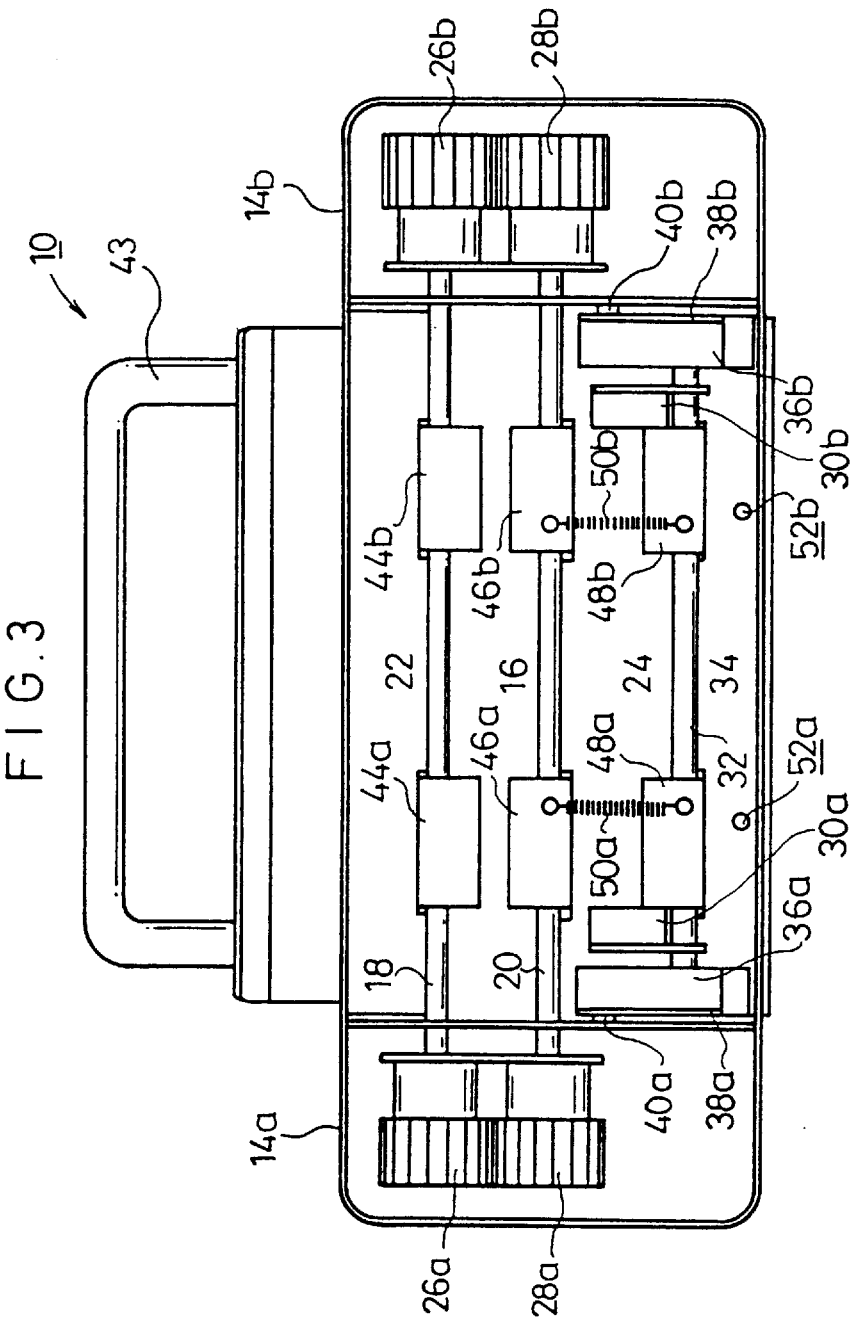
FIG. 3 is a bottom view of the seaweed roll making apparatus shown in FIG. 1.

As shown in FIG. 3, the casings 14a, 14b house respective first and second gears 26a, 26b fixed to respective ends of the first shaft 18 and also respective third and fourth gears 28a, 28b fixed to respective ends of the second shaft 20. The first gear 26a is held in mesh with the third gear 28a, and the second gear 26b is held in mesh with the fourth gear 28b. Since the first gear 26a and the third gear 28a rotate in opposite directions and the second gear 26b and the fourth gear 28b rotate in opposite directions, the first and second turn plates 22, 24 angularly move in opposite directions about the first and second shafts 18, 20, respectively.

Figure 4:
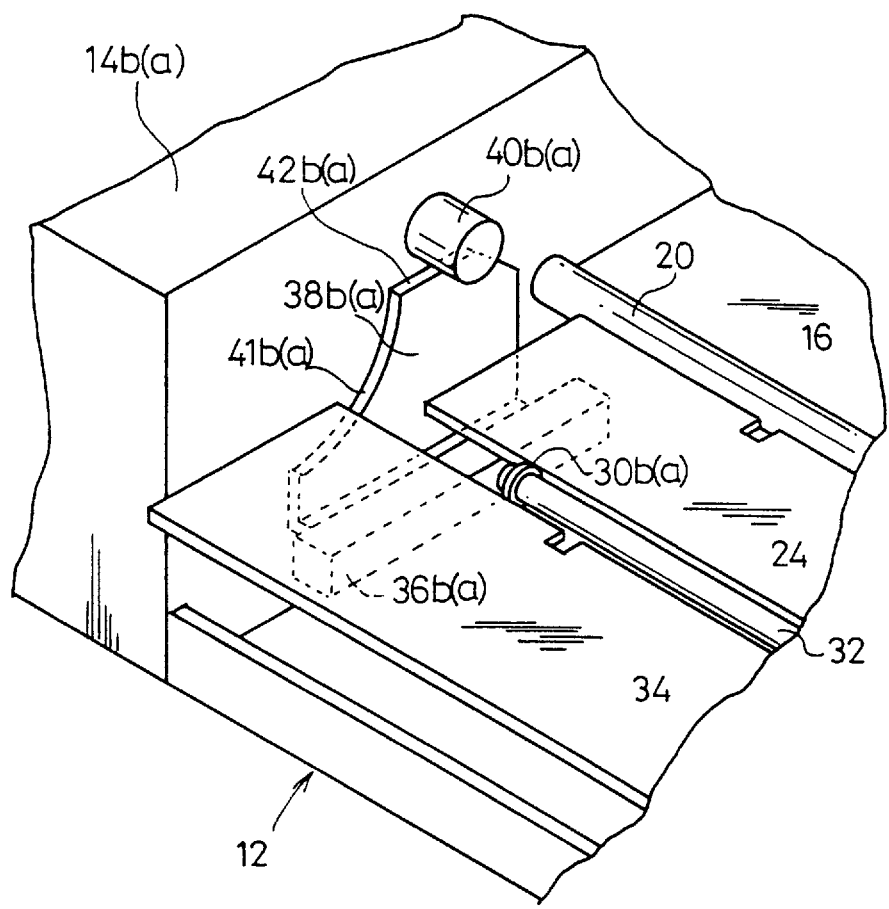
FIG. 4 is a fragmentary perspective view of a cam member of the seaweed roll making apparatus shown in FIG. 1.

A third shaft 32 is mounted on the second turn plate 24 by a pair of bearings 30a, 30b (see FIG. 3), and a third turn plate 34 is mounted on the third shaft 32. Cam members 38a, 38b are fixed to respective opposite ends of the third turn plate 34 by columnar members 36a, 36b, for controlling angular movement of the third turn plate 34. Pins 40a, 40b are mounted on respective wall of the casings 14a, 14b which are joined to the base 12, the pins 40a, 40b being held in engagement with peripheral surfaces of the cam members 38a, 38b. FIG. 4 shows each of the cam members 38a, 38b in detail. As shown in FIG. 4, the cam members 38a, 38b have respective curved surfaces 41a, 41b and respective straight surfaces 42a, 42b contiguous to the respective curved surfaces 41a, 41b. A handle 43 (see FIGS. 1–3) is fixed to the first turn plate 22.

The first, second, and third turn plates 22, 24, 34 have respective pairs of stops 44a, 44b, stops 46a, 46b, and stops 48a, 48b for limiting any movement of the first, second, and third turn plates 22, 24, 34 only to upward movement with respect to the base plate 12. As shown in FIG. 3, springs 50a, 50b are connected between the stops 46a, 48a and between the stops 46a, 48b for normally urging the second and third turn plates 24, 34 to lie flush with each other in a flat plane. The third turn plate 34 has a pair of holes 52a defined therein which serve as marks for positioning a sheet of seaweed.

A hollow elongate frame 54 shown in FIG. 1 may selectively used in combination with the seaweed roll making apparatus 10. If the frame 54 is used, then it is simply placed on the base plate 16 and the first, second, and third turn plates 22, 24, 34, for shaping a bed of rice to a given thickness in a given spatial range. The frame 54 may be used only when it is needed to shape a bed of rice. The frame 54 has a pair of teeth 58a, 58b mounted on its longitudinal opposite ends and having respective recesses 56a, 56b defined therein for receiving the pins 40a, 40b, respectively, and a grip 60 attached centrally to one longitudinal side edge thereof and extending laterally therefrom.

Figure 5:
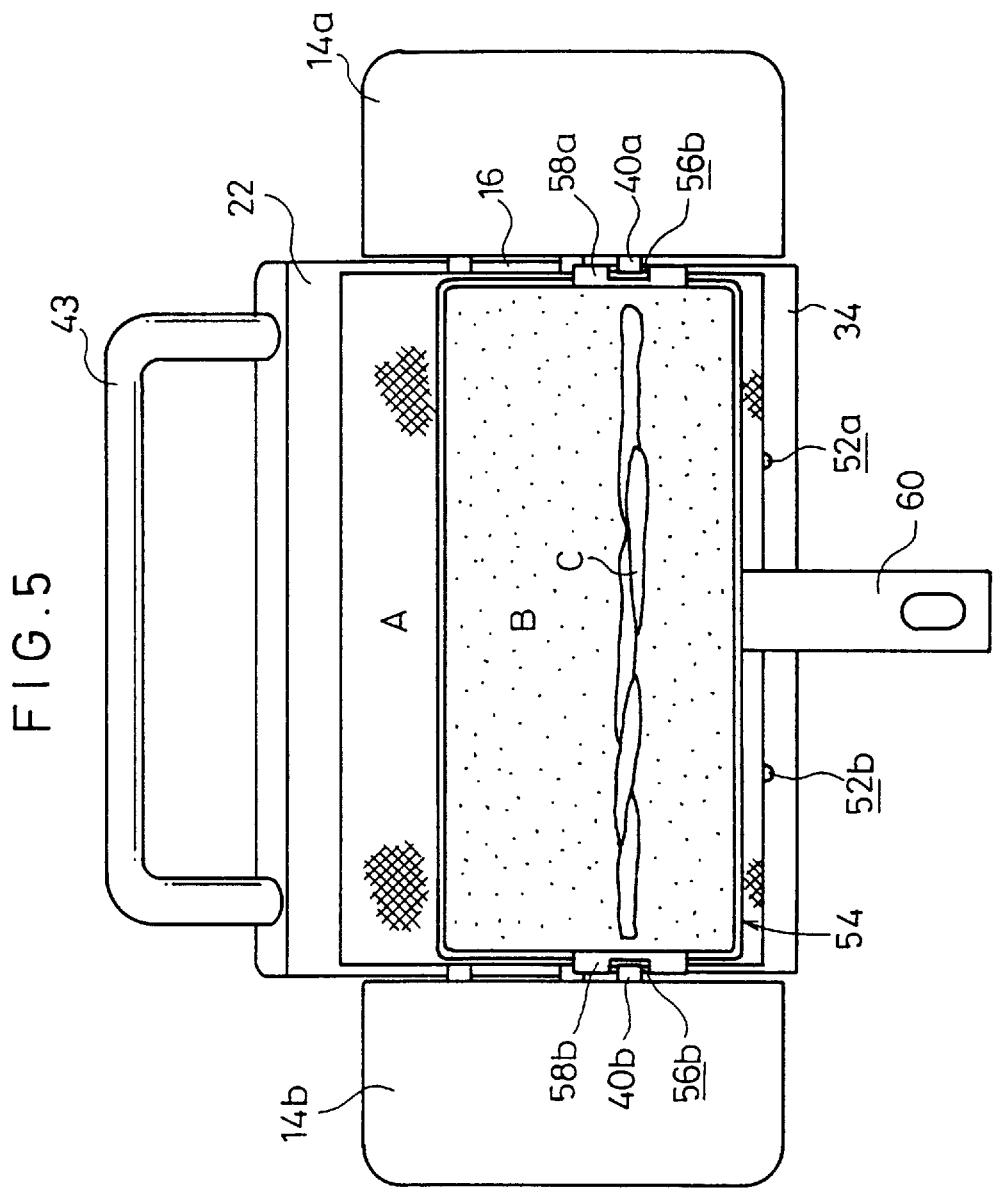
FIG. 5 is a plan view showing the manner in which of the seaweed roll making apparatus shown in FIG. 1 is used.
Figure 6:
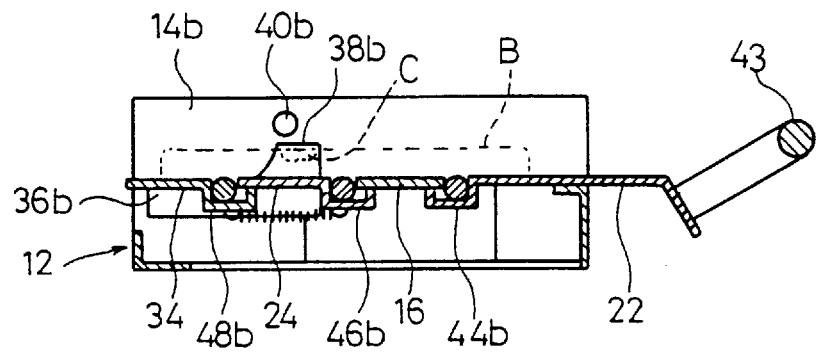
FIG. 6 is a cross-sectional view taken along line VI—VI of FIG. 2, showing a base plate and first through third turn plates which are held flatwise.

The seaweed roll making apparatus 10 of the above structure operates as follows:

As shown in FIG. 5, a sheet A of seaweed cut to a predetermined size is placed on the base plate 16 and the first, second, and third turn plates 22, 24, 34 with one edge of the sheet A of seaweed aligned with the holes 52a, 52b. Then, the frame 54 is put on the sheet A of seaweed with the pins 40a, 40b received in the respective recesses 56a, 56b in the teeth 58a, 58b. Thereafter, a bed B of rice is placed in the frame 54 fully across the width and depth of the frame 54. A groove is manually formed in the bed B of rice, and a core material C including calabash strips is placed in the groove. Thereafter, the frame 54 is removed, as shown in FIG. 6.

Figure 7:
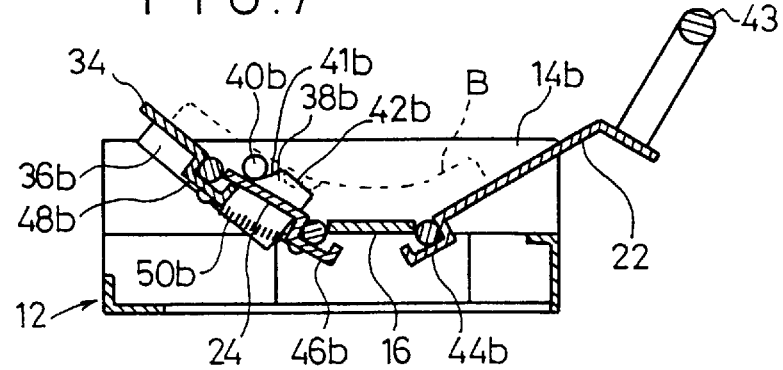
FIG. 7 is a cross-sectional view taken along line VI—VI of FIG. 2, showing the first through third turn plates which are angularly moved.

After the above preparatory process, the operator of the seaweed roll making apparatus 10 manually turns the handle 43 to angularly move the first turn plate 22 upwardly about the shaft 18. At this time, the second turn plate 24 is automatically angularly moved upwardly about the shaft 20 through the first gear 26a, the second gear 26b, the third gear 28a, and the fourth gear 28b, as shown in FIG. 7.

Figure 8:
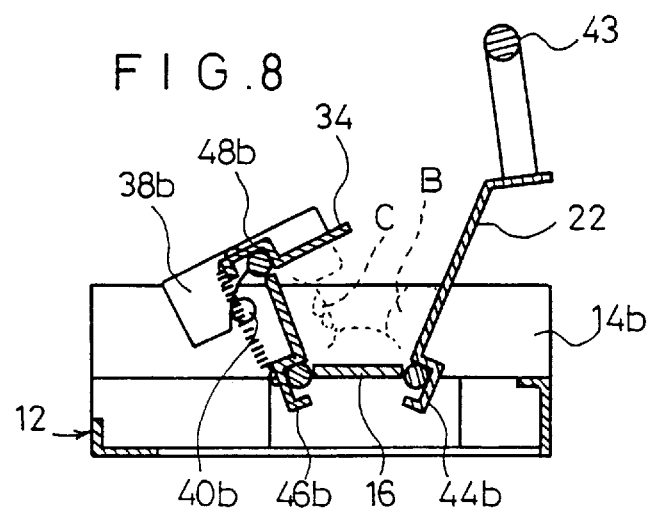
FIG. 8 is a cross-sectional view taken along line VI—VI of FIG. 2, showing the first through third turn plates which are angularly moved further from the position shown in FIG. 7.

The curved surfaces 41a, 41b of the cam members 38a, 38b engage the respective pins 40a, 40b (see FIG. 8), causing the third turn plate 34 to turn for thereby rolling up the bed B of rice (see FIG. 9). At this time, the pins 40a, 40b engage the respective straight surfaces 42a, 42b of the cam members 38a, 38b. When the handle 43 is turned, the third turn plate 34 is moved horizontally toward the first turn plate 22, and the bed B of rice is forcibly pressed between the first turn plate 22 and the second turn plate 24 (see FIG. 10). The bed B of rice is now hardly packed against accidental collapsing. Finally, the handle 43 is turned back to the position shown in FIG. 6, completing a seaweed roll.

The seaweed roll making apparatus 10 can make seaweed rolls of good appearance with the core material C positioned in the center, without requiring a high level of skill and experience on the part of the operator. The quality of produced seaweed rolls does not vary from operator to operator. The seaweed roll making apparatus 10 is of a relatively small size, does not occupy a large installation space, and requires only a relatively easy maintenance service.

A seaweed roll making apparatus according to a second embodiment of the present invention will be described below with reference to FIGS. 11 through 14.

Only those parts of the seaweed roll making apparatus according to the second embodiment which differ from those of the seaweed roll making apparatus according to the first embodiment will be described below. Those parts of the seaweed roll making apparatus according to the second embodiment which are identical to those of the seaweed roll making apparatus according to the first embodiment are denoted by identical reference numerals, and will not be described in detail below.

Figure 11:
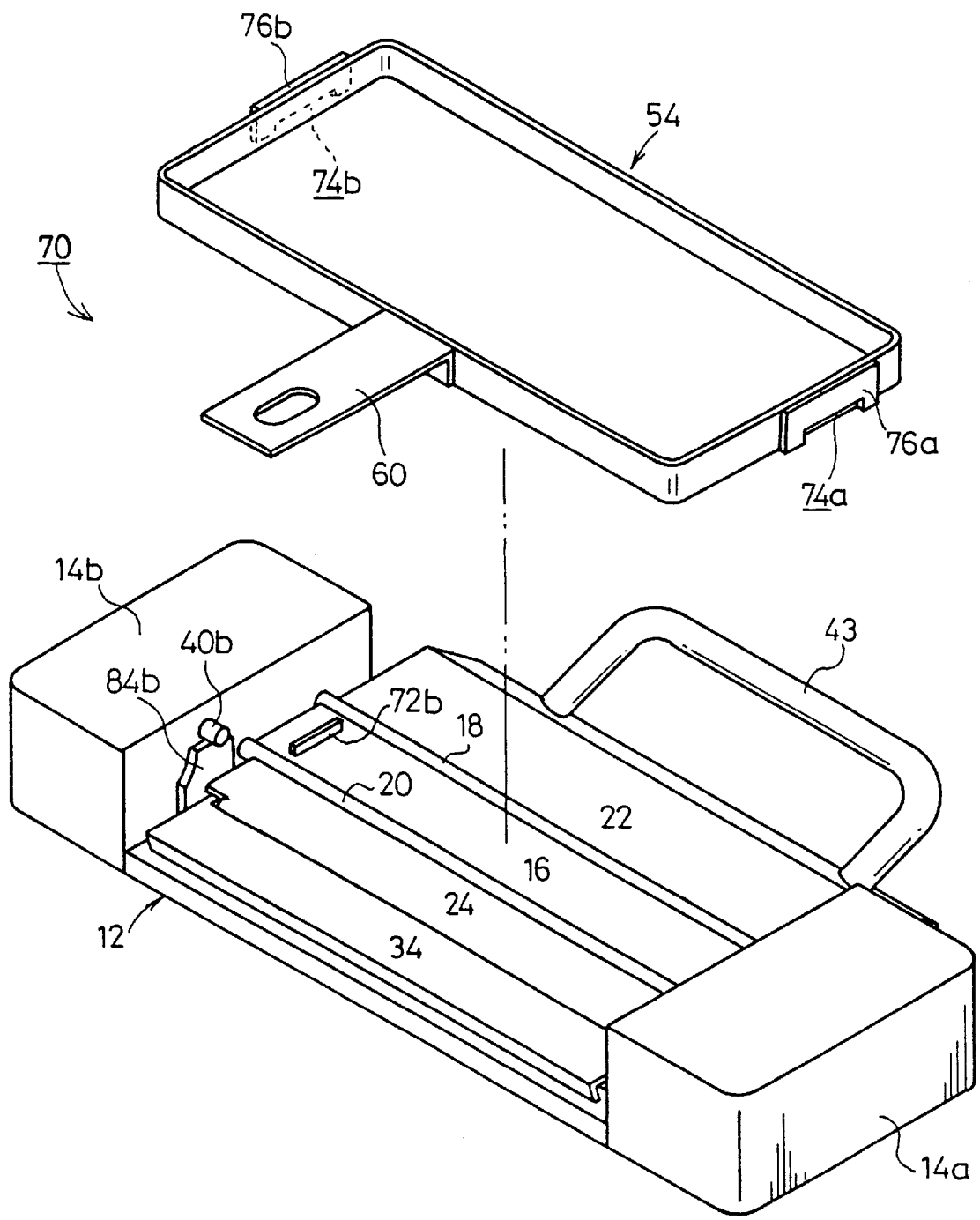
FIG. 11 is an exploded perspective view of a seaweed roll making apparatus according to a second embodiment of the present invention.
Figure 12:
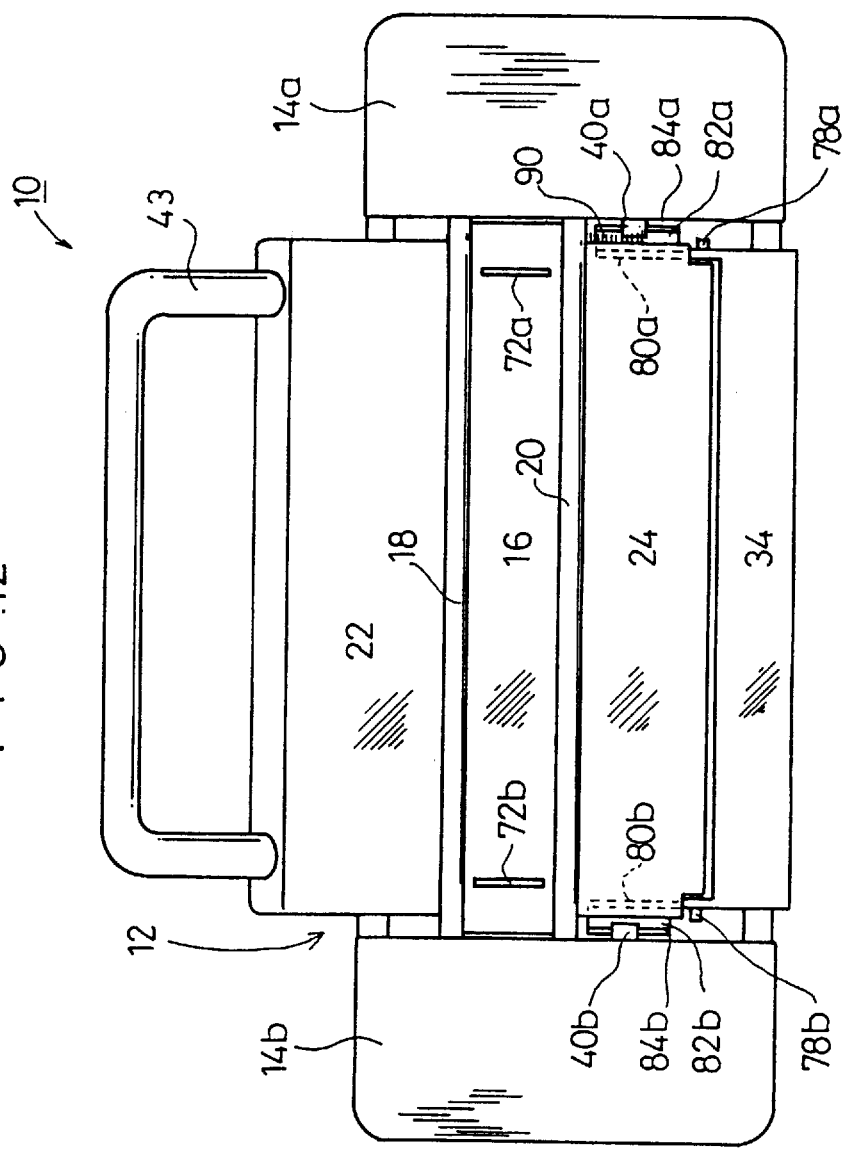
FIG. 12 is a plan view of the seaweed roll making apparatus shown in FIG. 11.
Figure 13:
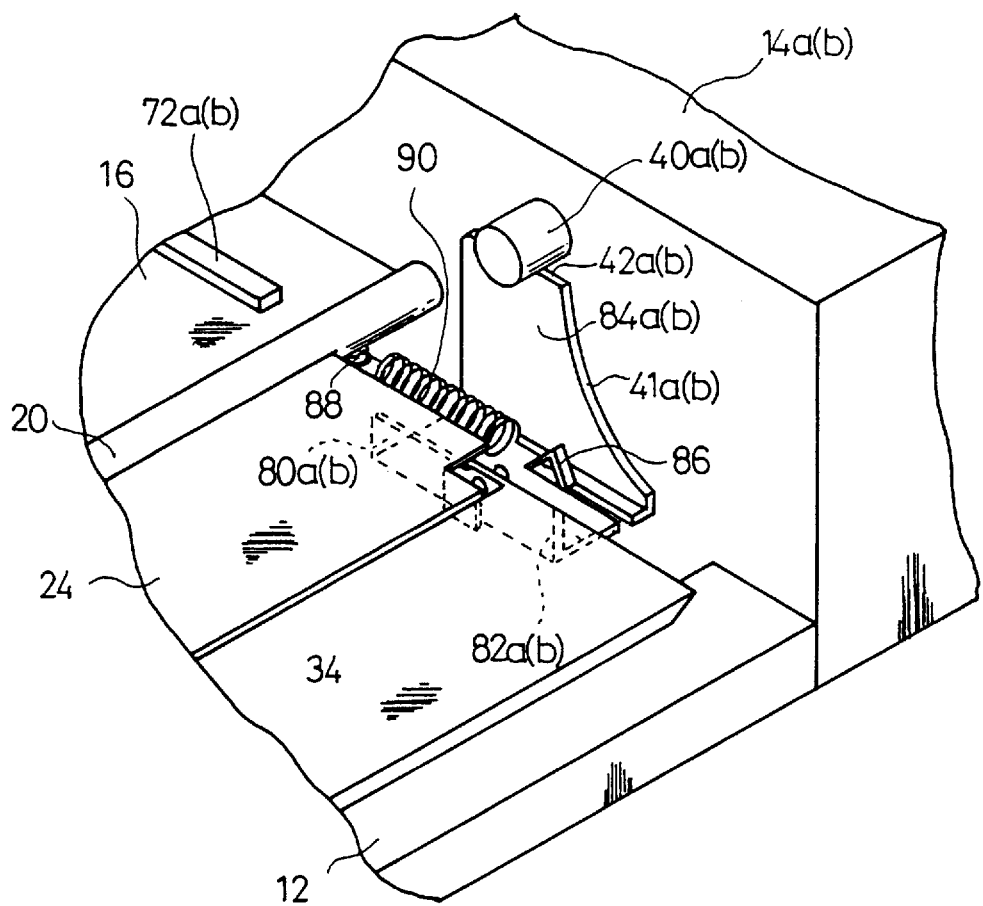
FIG. 13 is a fragmentary perspective view of a cam member of the seaweed roll making apparatus shown in FIG. 11.

As shown in FIGS. 11 and 12, the seaweed roll making apparatus, generally denoted at 70, according to the second embodiment has a pair of elongate ridges 72a, 72b disposed on the base plate 16 near its respective opposite ends and projecting upwardly. The frame 54 has a pair of plate members 76a, 76b attached to the respective longitudinal Opposite ends thereof and having respective recesses 74a, 74b defined therein. The plate members 76a, 76b are positioned to engage the ridges 72a, 72b, respectively.

The third turn plate 34 is mounted on the second turn plate 24 by shafts 78a, 78b, and has a pair of stops 80a, 80b extending from respective longitudinal ends thereof toward the second turn plate 24. The stops 80a, 80b act on the second turn plate 24 to limit any movement of the third plate 34 only to upward movement with respect to the base plate 12 (see FIG. 13). Cam members 84a, 84b extend through respective steps 82a, 82b from the stops 80a, 80b for controlling angular movement of the third turn plate 34. The third turn plate 34, the stops 80a, 80b, and the cam members 84a, 84b are integrally formed with each other.

The step 82a has a triangular retainer 86 which is connected to a retainer 88 on the second shaft 20 by a spring 90 that resiliently pulls the retainer 86 and the second shaft 20 to each other for thereby normally urging the second and third turn plates 24, 34 to lie flush with each other in a flat plane.

Figure 14:
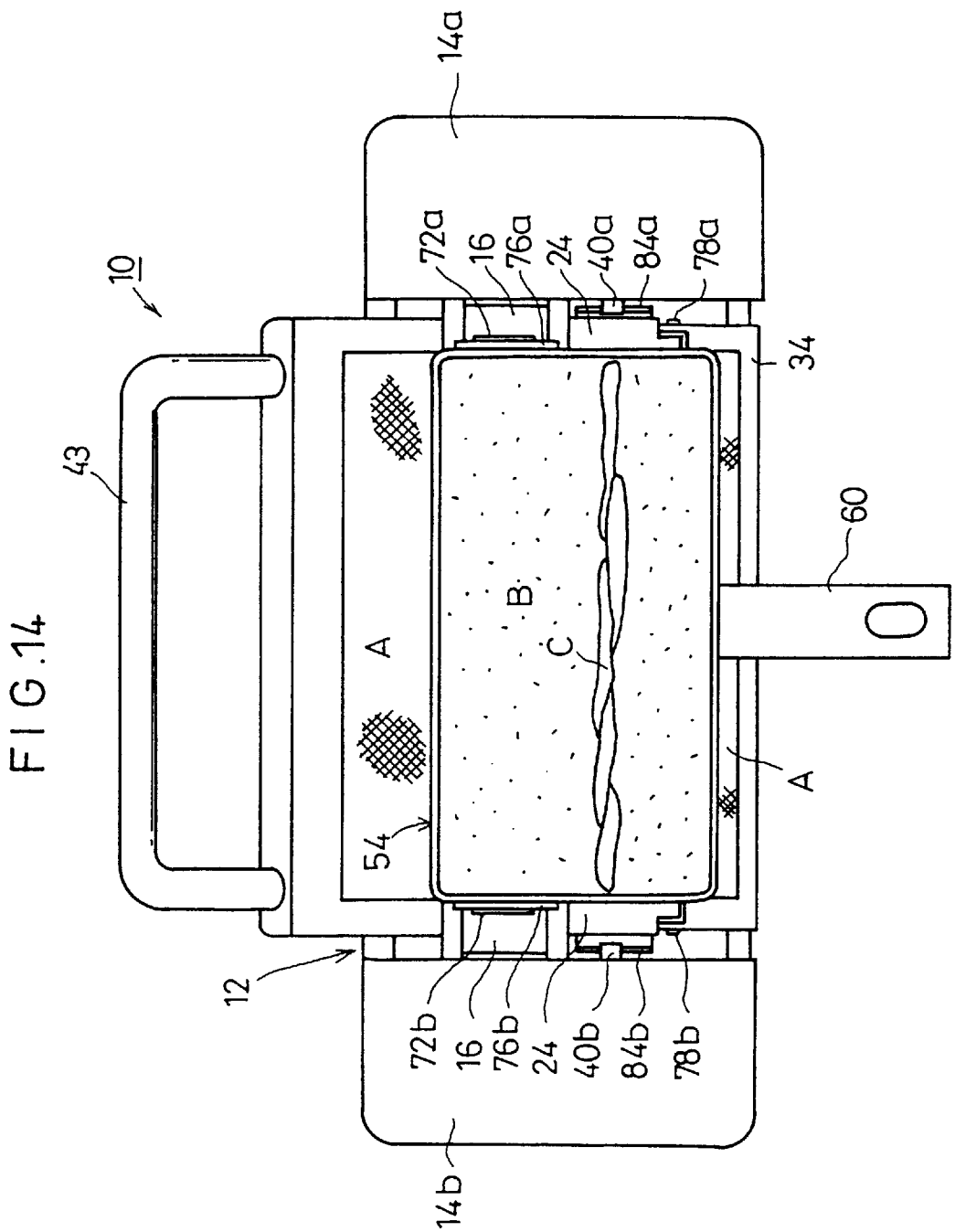
FIG. 14 is a plan view showing the manner in which of the seaweed roll making apparatus shown in FIG. 11 is used.

For making a seaweed roll on the seaweed roll making apparatus 70, a sheet A of seaweed cut to a predetermined size is placed on the base plate 15 between the ridges 72a, 72b (see FIG. 14). Then, the frame 54 is put on the sheet A of seaweed with the ridges 72a, 72b being received in the respective recesses 74a, 74b in the plate members 76a, 76b. Thereafter, a bed B of rice and a core material C are placed on the frame 54, which is then removed. The operator then turns the handle 43 to angularly move the first turn plate 22. The seaweed roll making apparatus 70 then operates in a manner similar to the seaweed roll making apparatus 10 according to the first embodiment fox completing a seaweed roll.

The seaweed roll making apparatus 70 according to the second embodiment can make seaweed rolls of good appearance without requiring a high level of skill and experience on the part of the operator. The quality of produced seaweed rolls does not vary from operator to operator. The seaweed roll making apparatus 70 does not occupy a large installation space, and requires only a relatively easy maintenance service.

A seaweed roll making apparatus according to a third embodiment of the present invention will be described below with reference to FIGS. 15 through 18. Those parts of the seaweed roll making apparatus according to the third embodiment which are identical to those of the seaweed roll making apparatus according to the first embodiment are denoted by identical reference numerals, and will not be described in detail below.

Figure 15:
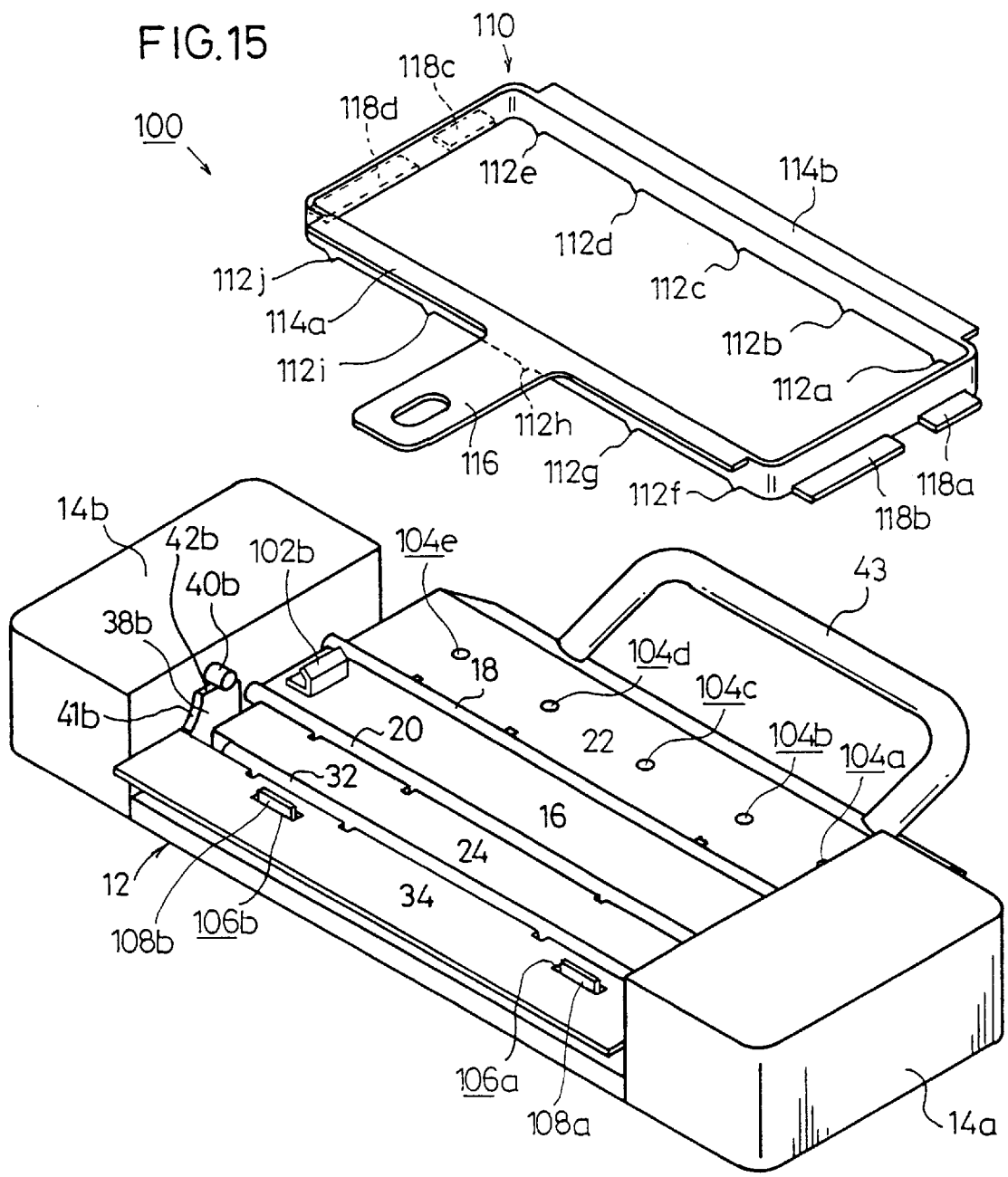
FIG. 15 is an exploded perspective view of a seaweed roll making apparatus according to a third embodiment of the present invention.
Figure 16:
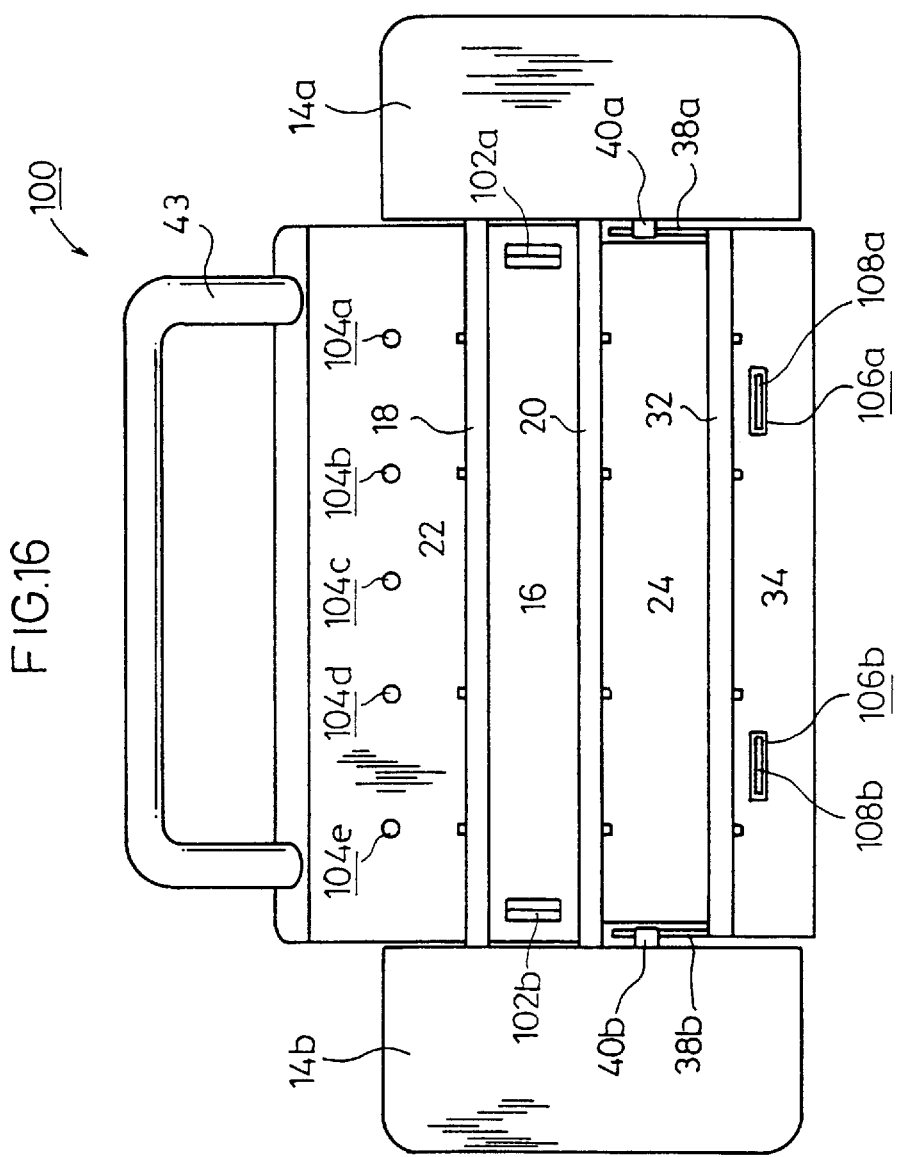
FIG. 16 is a plan view of the seaweed roll making apparatus shown in FIG. 15.
Figure 17:
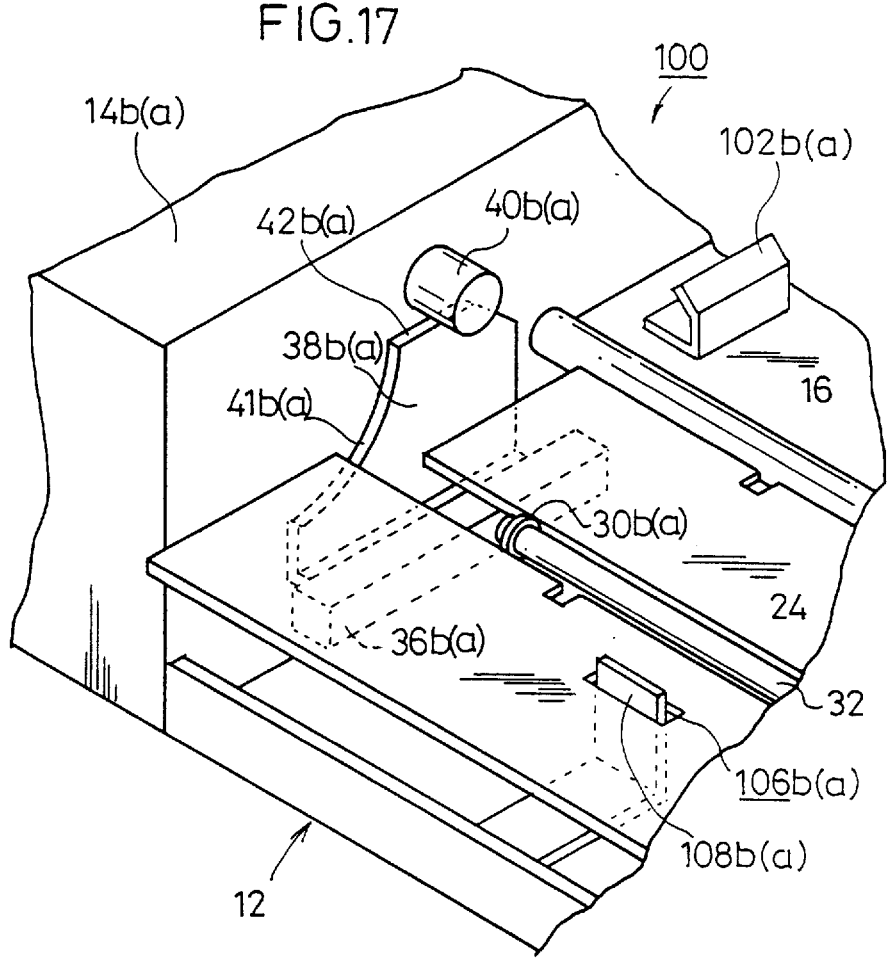
FIG. 17 is a fragmentary perspective view of a cam member of the seaweed roll making apparatus shown in FIG. 15.

As shown in FIGS. 15 and 16, the seaweed roll making apparatus, generally denoted at 100, according to the third embodiment has a pair of bent engaging members 102a, 102b disposed on the base plate 16 near its respective opposite ends and projecting upwardly. The first turn plate 22 has a plurality of holes 104a~104e defined therein at equal spaced intervals in its longitudinal direction. The third turn plate 34 has a pair of elongate rectangular holes 106a, 106b defined therein for receiving engaging plates 108a, 108b which project upwardly from the base plate 12. When the engaging plates 108a, 106b are inserted in the respective holes 106a, 106b, the engaging plates 108a, 108b have respective tip ends projecting slightly above the third turn plate 34 (see FIG. 17).

As shown in FIG. 15, a frame 110 has a plurality of teeth 112a~112e, 112f~112j integrally formed with lower edges of longitudinal side members thereof at equal spaced intervals. The teeth 112a~112e, 112f~112j have sharply pointed lower ends so that they can easily pierce a sheet of seaweed. The frame 110 also has a pair of flanges 114a, 114b extending outwardly from upper edges of the longitudinal side members thereof. A grip 116 is integrally formed with and extends laterally from the flange 114a. The grip 116 allows the operator to handle the frame 110. The grip 116 may extend directly from the side member of the frame 110, rather than the flange 114a. The frame 110 also has a plurality of integral bent plates 118a~118d extending outwardly from lower edges of transverse side members thereof. The bent plates 118a, 118b are spaced from each other by a gap which can receive the engaging member 112a therein, and the bent plates 118c, 118d are spaced from each other by a gap which can receive the engaging member 112b therein.

Figure 18:
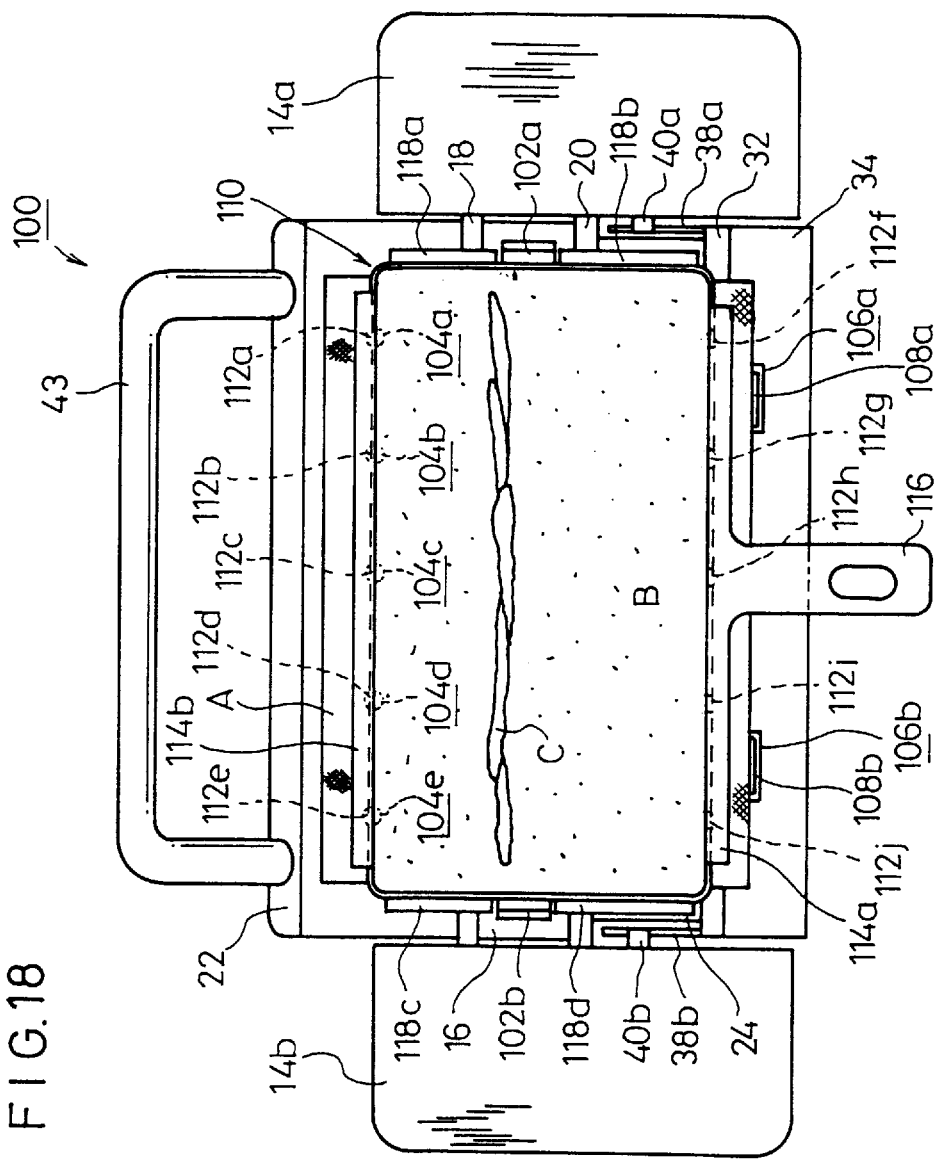
FIG. 18 is a plan view showing the manner in which of the seaweed roll making apparatus shown in FIG. 15 is used.

The seaweed roll making apparatus 100 according to the third embodiment operates as follows:

As shown in FIG. 18, a sheet A of seaweed cut to a predetermined size is placed on the base plate 16 and the first, second, and third turn plates 22, 24, 34 with one edge of the sheet A of seaweed positioned by abutment against the engaging plates 108a, 108b. Then, the frame 110 is put on the sheet A of seaweed and positioned by the engaging members 102a, 102b received in the gaps between the bent plates 118a, 118b and 118c, 118d. At this time, the teeth 112a~112j pierce the sheet A of seaweed. The teeth 112a~112e on one of the longitudinal side members of the frame 110 engage in the respective holes 104a~104e, and the teeth 112f~112j on the other longitudinal side member of the frame 110 are inserted in a space adjacent to the second turn plate 24 and the third shaft 32. Therefore, the sheet A of seaweed is fixed to the base plate 16 and the first, second, and third turn plates 22, 24, 34 by the teeth 112a~112j for protection against accidental positional displacement.

Thereafter, a bed B of rice is placed in the frame 110 fully across the width and depth of the frame 110. The bed B of rice is thus shaped to a form defined by internal edges of the frame 110. If the bed B of rice is placed in the frame 110 up to the level of the flanges 114a, 114b, then any beds B of rice thus introduced in the frame 110 can be of a substantially constant amount at all times. Since the sheet A of seaweed is positioned in place as described above, the operator is not required to hold the sheet A of seaweed by hand, but can put the bed B of rice into the frame 110 with both hands. Therefore, the manual process of putting the bed B of rice into the frame 110 is facilitated.

Thereafter, a core material C including calabash strips is placed on the bed B of rice, and then the frame 110 is removed. The operator then turns the handle 43 to angularly move the first turn plate 22. The seaweed roll making apparatus 100 then operates in a manner similar to the seaweed roll making apparatus 10 according to the first embodiment for completing a seaweed roll.

In the third embodiment, the operator can place any beds B of rice into the frame 110 in a substantially constant amount at all times, and can easily put the bed B of rice into the frame 110 because the sheet A of seaweed is prevented from being displaced out of position.

A seaweed roll making apparatus according to a fourth embodiment of the present invention will be described below with reference to FIGS. 19 through 21. Those parts of the seaweed roll making apparatus according to the fourth embodiment which are identical to those of the seaweed roll making apparatus according to the first, second, and third embodiments are denoted by identical reference numerals, and will not be described in detail below.

As shown in FIGS. 19 and 20, the seaweed roll making apparatus, generally denoted at 120, according to the third embodiment is similar to a combination of the seaweed roll making apparatus 70, 100 according to the second and third embodiments. As with the seaweed roll making apparatus 100, the seaweed roll making apparatus 120 has a pair of bent engaging members 102a, 102b disposed on the base plate 16 near its respective opposite ends and projecting upwardly. The first turn plate 22 has a plurality of holes 104a~104e defined therein at equal spaced intervals in its longitudinal direction. The third turn plate 34 has a pair of elongate rectangular holes 106a, 106b defined therein for receiving engaging plates 108a, 108b which project upwardly from the base plate 12. When the engaging plates 108a, 108b are inserted in the respective holes 106a, 106b, the engaging plates 108a, 108b have respective tip ends projecting slightly above the third turn plate 34. The frame 110 has a plurality of teeth 112a~112e, 112f~112j, a pair of flanges 114a, 114b, a grip 116, and a plurality of bent plates 118a~118d. As with the seaweed roll making apparatus 70, the third turn plate 34 has a pair of stops 80a, 80b extending from respective longitudinal ends thereof toward the second turn plate 24. Cam members 84a, 84b extend through respective steps 82a, 82b from the stops 80a, 80b for controlling angular movement of the third turn plate 34. The third turn plate 34, the stops 80a, 80b, and the cam members 84a, 84b are integrally formed with each other For making a seaweed roll on the seaweed roll making apparatus 120, as shown in FIG. 21, a sheet A of seaweed cut to a predetermined size is placed on the base plate 16 and the first, second, and third turn plates 22, 24, 34, and then the frame 110 is placed on the sheet A of seaweed. At this time, the teeth 112a~112j pierce the sheet A of seaweed to hold the sheet A of seaweed against accidental displacement.

Thereafter, a bed B of rice and a core material C are placed in the frame 110, and then the frame 110 is removed.

The operator then turns the handle 43 to angularly move the first turn plate 22. The seaweed roll making apparatus 120 then operates in a manner similar to the seaweed roll making apparatus 10 according to the first embodiment for completing a seaweed roll.

In the fourth embodiment, the operator can place any beds B of rice into the frame 110 in a substantially constant amount at all times, and can easily put the bed B of rice into the frame 110 because the sheet A of seaweed is prevented from being displaced out of position.

Although certain preferred embodiments of the present invention have been shown and described in detail, it should be understood that various changes and modifications may be made therein without departing from the scope of the appended claims.

What is claimed is:

1. An apparatus for making a seaweed roll, comprising:
    a base (12);
    a base plate (16) fixedly mounted on said base (12);
    a plurality of turn plates (22, 24, 34) angularly movable with respect to said base plate (16);
    rotating means for operatively interconnecting said turn plates (22, 24, 34) for ganged angular movement; and
    a manual handle (43) for angularly moving said turn plates (22, 24, 34) through said rotating means;
    wherein a sheet (A) of seaweed is placed on said base plate (16) and said turn plates (22, 24, 34), a bed (B) of rice is placed on the sheet (A) of seaweed, and a core material (C) is selectively placed on the bed (B) of rice, and thereafter said manual handle (43) is moved to angularly displace said turn plates (22, 24, 34) with respect to said base plate (16) to roll up the sheet (A) of seaweed and the bed (B) of rice into a seaweed roll having a polygonal or circular cross section with said base plate (16) and said turn plates (22, 24, 34).

2. An apparatus according to claim 1, wherein said turn plates (22, 24, 34) include:
    a first turn plate (22) disposed along a side of said base plate (16) by a first shaft (18);
    a second turn plate (22) disposed along an opposite side of said base plate (16) by a second shaft (20); and
    a third turn plate (34) angularly movably mounted on said second turn plate (22).

3. An apparatus according to claim 2, further comprising cam members (38a, 38b, 84a, 84b) mounted on said third turn plate (34) for controlling angular movement of said third turn plate (34).

4. An apparatus according to claim 3, wherein said base plate (12) has a pair of pins (40a, 40b) for engaging said cam members (38a, 38b, 84a, 84b) to angularly displace said third turn plate (34) with respect to said second turn plate (24) when the first, second, and third turn plates (22, 24, 34) are angularly moved with respect to said base plate (16).

5. An apparatus according to claim 3, wherein said third turn plate (34) has a pair of stops (80a, 80b) for limiting any movement of said third turn plate (34) to upward movement with respect to said base plate (12), and said third turn plate (34), said stops (80a, 80b), and said cam members (84a, 84b) are integrally formed with each other.

6. An apparatus according to claim 2, wherein said rotating means comprises first and second gears (26a, 26b) fixed to respective ends of said first shaft (18) and third and fourth gears (28a, 28b) fixed to respective ends of said second shaft (20), said first and third gears (26a, 28a) meshing with each other and said second and fourth gears (26b, 28b) meshing with each other, whereby said first turn plate (22) and said second turn plate (24) can be angularly moved in opposite directions.

7. An apparatus according to claim 1, further comprising a frame (54, 110) for shaping the bed (B) of rice to a predetermined thickness in a predetermined spatial range.

8. An apparatus according to claim 7, wherein either one of said turn plates (22, 24, 34) has a pair of holes (106a, 106b) defined therein, said base (12) having a pair of engaging plates (108a, 108b) fixed thereto for being inserted in said holes (106a, 106b), respectively, and projecting upwardly of said either one of said turn plates (22, 24, 34), said frame (110) having a plurality of teeth (112a~112j) integrally formed with lower edges thereof, either one of said turn plates (22, 24, 34) having a plurality of holes (104a~104e) defined therein for receiving said teeth (112a~112j).

9. An apparatus according to claim 7, wherein said frame (54, 110) has a grip (60, 116).

10. An apparatus according to claim 7, wherein said frame (110) has a pair of flanges (114a, 114b) extending outwardly from upper edges thereof.

11. An apparatus according to claim 10, wherein said frame (110) has a grip (116) extending from one of said flanges (114a).

* * * * *